United States Patent [19]

Stocklin et al.

[11] 3,923,274

[45] Dec. 2, 1975

[54] DEVICE FOR CENTERING AND ARRESTING AN AIRCRAFT POSITIONED ON A TAKE-OFF AND LANDING PLATFORM AND STARTING THEREFROM AND LANDING THEREON

[75] Inventors: Helmut Stocklin, Markdorf; Werner Keck, Friedrichshafen, both of Germany

[73] Assignee: Dornier GmbH, Friedrichshafen, Germany

[22] Filed: Dec. 18, 1974

[21] Appl. No.: 534,062

[30] Foreign Application Priority Data

Mar. 7, 1974 Germany............................ 2410818

[52] U.S. Cl................................ 244/115; 244/17.17
[51] Int. Cl.$^2$ ........................................... B64F 1/12
[58] Field of Search..... 244/114 R, 115, 116, 17.17, 244/17.11

[56] References Cited
UNITED STATES PATENTS

| | | | |
|---|---|---|---|
| 2,736,520 | 2/1956 | Chichester, Jr.................. | 244/114 R |
| 3,392,940 | 7/1968 | Van Valkenburg................ | 244/115 |
| 3,640,490 | 2/1972 | Baekken........................... | 244/116 |

Primary Examiner—Trygve M. Blix
Assistant Examiner—Paul E. Sauberer
Attorney, Agent, or Firm—James E. Bryan

[57] ABSTRACT

This invention relates to a device for centering and arresting an aircraft positioned on a take-off and landing platform or starting therefrom and landing thereon, particularly a captive aircraft having a rotor and a landing ring, comprising a platform and a rotatable displacing ring, a piston for rotating the displacing ring, vertically-displaceable and spring-suspended grippers distributed at the circumference of the platform and the displacing ring, the grippers being pivotal about centering and locking elements, elements for running the grippers against an aircraft landing ring after the aircraft has landed on the platform, thereby pushing the aircraft into a centered position, at which time the aircraft is brought into the arrested position thereof by rotation about its vertical axis, and elements for vertically displacing the grippers, whereby the aircraft is pulled against the platform.

4 Claims, 4 Drawing Figures

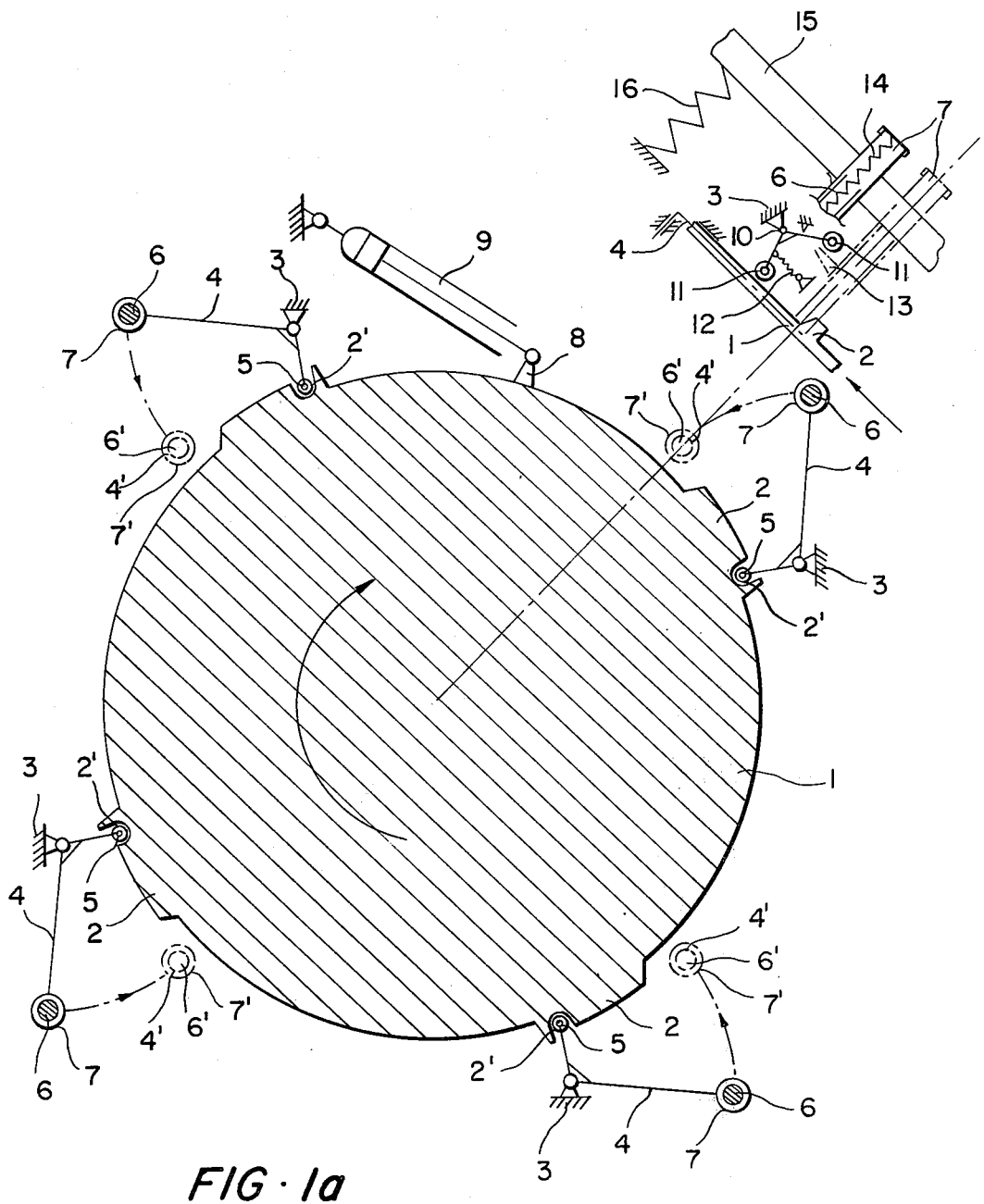
FIG·1b
FIG·1a

DEVICE FOR CENTERING AND ARRESTING AN AIRCRAFT POSITIONED ON A TAKE-OFF AND LANDING PLATFORM AND STARTING THEREFROM AND LANDING THEREON

The present invention relates to a device for centering and arresting an aircraft positioned on a starting and landing platform, and starting therefrom and landing thereon, particularly to a captive aircraft having a rotor and a landing ring.

Similar devices are known from the literature. Described, for example, in Deutsche Auslegeschrift No. 1,107,091, is a starting and landing aid which is composed of one or more frames to be positioned on the ground, which frames are either set into the base of a runway, or placed thereupon and secured by anchoring means, for example by means of anchoring bolts which are received in perforated projections on the lower outer edge.

Known from German Pat. No. 1,216,121, is a transporting and starting device for a foldable helicopter in which the supporting and holding devices for the folded helicopter are carried by the end and side walls of its container. In this case, the supporting and holding means for the folded helicopter are removable from the walls and the bottom of the container so that they will not damage the structure as well as impair the take-off and landing of the helicopter.

Further known from German Pat. No. 1,113,636, is a transportable take-off vehicle for vertical take-off airplanes in which, for example, an airplane with annular wings is positioned in a movable cradle and is supported by two journals. The cradle is rigidly connected with two arms, the free ends of which are hingedly connected to a fixed point of the vehicle chassis. The two ends of the cradle have elongations for receiving pivots secured to the annular wings of the airplane. While the airplane, in the resting position thereof, is secured at the front end in the customary fashion, its attachment at the tail end is effected by a bracket fixed at a lower foot of the landing gear and secured to a transverse support.

Lastly, known from German Offenlegungsschrift No. 1,506,006, is a landing device for vertically-landing airplanes and aircraft in which a landing gear is employed that is separate from the aircraft and is composed of a receiving bed elastically positioned in the vertical direction and adapted to a conical shape matching the aircraft, and having centering and anchoring means for the aircraft. The centering device in this case is composed of a bolt which projects out of the aircraft and engages in an angular recess when the aircraft touches down, thus centering the latter. The receiving bed is conical, as is the front portion of the aircraft, whereby the aircraft is centered about its horizontal axis. The anchoring and arresting device operates in such a manner that an annular frame which is positioned in the lower part of the cell of the aircraft has several projections at the circumference thereof over which inclined lever surfaces snap after the aircraft has touched down. These surfaces are so positioned in a corresponding number at the circumference of the receiving bed that they are prestressed by means of springs. The levers are interconnected by way of a cable so that, when the cable is pulled, all of the levers are uniformly unlocked.

All of these known holding, centering, and arresting devices for takeoff and landing platforms have the common disadvantage that they are constructed either as individual devices fulfilling a particular task, i.e. as devices for holding, or centering, or arresting, or as combined devices which are, however, positioned relatively far apart with respect to each other and operate separately from each other, and must be manually operated. In other words, in none of these prior art devices are there continuous interdependent, and imperative functions or operations provided for.

It is the object of the present invention to provide a centering and arresting device suitable for take-off and landing platforms for aircraft, particularly captive aircraft, in which the operations proceed in a continuously controlled manner, and wherein the aircraft or airplane, after touching down on the platform, is initially centered automatically and subsequently arrested. Furthermore, it is intended that the centering and arresting elements be positioned if possible in one plane, at least relatively closely with respect to each other, in or at the platform.

This object is obtained, in accordance with the present invention, by virtue of the fact that positioned therein, distributed at the circumference of the platform and of an adjusting ring, and controlled by a known double-acting operating cylinder and pivotal about centering and locking elements, are vertically displaceable and spring-suspended grippers of known construction and which, after the aircraft has touched down on the platform, run against the landing ring, thereby pushing the aircraft into a centered position, whereby the aircraft — due to rotation about its vertical axis — is brought into the arrested position thereof, and whereby, due to a vertical displacement of the grippers, the aircraft is pulled to a stop against the platform.

In a further embodiment, the present invention provides that the operating cylinder actuates the centering and locking elements synchronously and in a specific sequence by means of a rotatably positioned displacing ring and cams mounted thereon. Additionally, the locking procedure is released by a control signal after alignment of the aircraft.

The advantages obtained with the present invention reside particularly in that the aircraft, after touching down on the platform, is initially gripped by a pivoting-in of the grippers which are distributed at the circumference and are pivotal, vertically displaceable, and spring-suspended, and further are controlled by a double-acting operating cylinder, whereby these grippers run against a landing ring mounted at the foot portion of the aircraft. At the same time, the aircraft is centered by centering and locking elements also positioned at the circumference of the landing table and controlled by the operating cylinder, and it is initially arrested to such an extent that a rotation of the aircraft is possible only about the vertical axis thereof. At that time, the aircraft is turned, while use is made of the braking moment during braking of the rotor, into a definite angular position about its vertical axis. Simultaneously, stops at the landing ring run against the grippers. Thereafter, the aircraft is finally arrested by a vertical pulling up of the pivoted-in grippers, and pulled to a stop against the platform.

Operative against a corresponding stop at the grippers for pulling up the grippers is one lever-like locking element each which is rotatably positioned at a box frame with which the platform is connected. The transmission elements, for the centering and locking, from the hydraulic operating cylinder to the grippers are positioned in a ring-shaped fashion around the platform. Actuated by the hydraulic operating cylinder — by means of a displacing ring rotatably positioned within an annular auxiliary construction at the box frame and by means of cams mounted thereon — are the centering and locking levers, synchronously and in a specific sequence, which levers, in turn, will then move the grippers horizontally, thereby centering them and vertically, thereby locking them. The operating cylinder itself is double-acting and is equipped with a bilateral end position damping means. For the extended end position and the arresting position, the cylinder comprises a mechanical catching mechanism in order that, in case of decreasing pressure or with the hydraulic system being turned off, the centering and arresting of the aircraft is guaranteed. The control of the cylinder is effected by way of an electrically-actuated 4/3 path valve.

For centering and arresting the aircraft after landing, the cylinder stroke is subdivided into two steps. The cylinder piston runs in this case from its retracted end position after a specific path against an end switch which determines the centering. As a result, the signal present at the valve is interrupted and the cylinder is hydraulically blocked. After, during the rotor braking, the aircraft has become aligned in a specific position, the arresting procedure is started by a new control signal. At that time, the cylinder runs into its extended end position and arresting position. During the take-off of the aircraft, the sequence of movements of the cylinder is reversed. In that case, the arresting and centering will be released in a single operation without interruption.

The inventive device affords the specific advantage that the aircraft together with its platform may be employed in a mobile manner and may, for example, be housed in containers and carried along. For this purpose, the rotor blades must be folded and put away, which presupposes an exactly defined position and locking of the aircraft on the platform.

One embodiment of the present invention will now be further described hereinafter on the basis of and with reference to the accompanying drawings, wherein FIG. 1a illustrates the basic arrangement of a centering and arresting device in the centering position thereof;

FIG. 1b illustrates the arrangement of centering and arresting elements with a gripper in a side view thereof according to FIG. 1a;

Figures 2A, 2B:
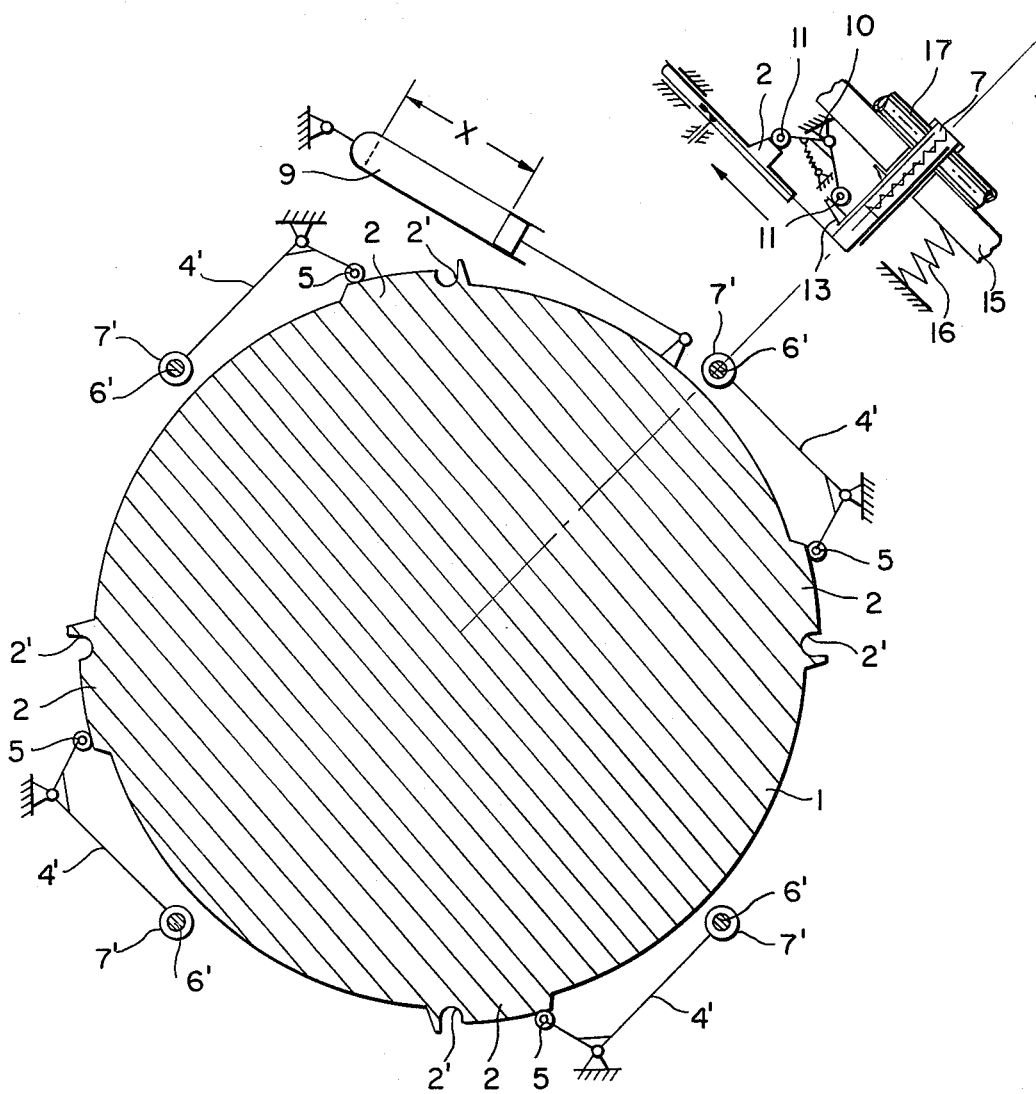
FIG. 2a illustrates the arrangement according to FIG. 1a for the completed arresting operation.
FIG. 2b illustrates the arrangement according to FIG. 1b and 2a with the gripper pulled-up and with locked lever elements.

Shown in FIG. 1a at the circumference of a displacing ring 1 are the cams 2 and 2' positioned opposite the latter in each case at a box frame 3, which is only schematically indicated in the figure, are rotatably mounted centering levers 4, and at whose ends there are mounted the rollers 5 and bolts 6 with the grippers 7 superimposed thereto. Likewise at the circumference of the displacing ring 1 and between the cams 2 and 2' there engages — rotatably positioned with one end thereof at a follower member 8 — an operating cylinder 9 which, with the other end thereof, is also movably mounted at the box frame 3 (only schematically indicated). When the displacing ring 1 is turned by means of the operating cylinder 9 (see the direction of the arrow), the rollers 5 slide out of the cams 2' onto the cams 2, at which time the centering levers 4 together with the bolts 6 and the grippers 7 pivot against the circumference of the displacing ring 1 (see the direction of the arrow) and thereby assume positions 4', 6' and 7' (see also FIG. 2a).

Apparent from the view presented in FIG. 1b is the operational sequence and the position of the centering lever 4 and the locking lever 10. Positioned ahead of the displacing ring 1 with the cam 2 is the centering lever 4. Mounted thereabove is the locking lever 10 being rotatably and tiltably positioned at the box frame 3 (only schematically indicated), and the ends of which lever 10 are provided with one roller 11 each. One of the lever arms facing the displacing ring 1 is held in the starting position with a spring 12 engaging thereat. The other lever arm and the roller 11 mounted thereon is positioned above the follower member 13 of the gripper 7. The gripper 7 itself is constructed as a tube in which there is positioned a bolt 6 which is prestressed by means of a spring 14. The platform 15 is positioned ahead of or behind the gripper 7 is held by a spring element 16 in the unstressed condition in the upper end position. When the displacing ring 1 is turned (see the direction of the arrow, and according to FIG. 1a), the cam 2 moves against one roller 11 of the locking lever 10, whereby the second roller 11 positioned thereabove presses against the follower member 13, thereby pulling the gripper 7, together with the landing ring 17 (see FIG. 2b) and the platform 15, downwardly (also see FIG. 2b).

In FIG. 2a, the displacing ring 1 is turned by the amount of the piston stroke $x$ of the operating cylinder 9. In this case, as has already been mentioned in connection with FIG. 1a, the rollers 5 have passed from the cams 2' onto the cams 2, whereby the centering levers 4, (4') together with the bolts 6 (6') and grippers 7 (7') positioned thereat have been pivoted against the circumference of the displacing ring 1.

FIG. 2b shows the locking position of the locking lever 10. In this case, the displacing ring 1 has been turned (see the direction of the arrow) according to FIG. 2a, and as has been briefly mentioned in connection with FIG. 1b, whereby the cam 2 thereon has become positioned under the roller 11 of the locking lever 10. At the same time, the locking lever 10 with its second roller 11 pressing upon the follower member 13 has been pivoted downwardly, whereby the gripper 7 presses against the landing ring 17 and is pulled, together with the platform 15, against the action of the spring element 16.

Therewith the locking or arresting operation apparent from FIGS. 2a and 2b is completed, the aircraft has been pulled fast on the platform and thus may be housed in a mobile container or carrier and transported without the risk of its sliding out of place or becoming detached from the platform, and hence without the risk of damage thereto.

It will be obvious to those skilled in the art that many modifications may be made within the scope of the present invention without departing from the spirit thereof, and the invention includes all such modifications.

What is claimed is:

1. A device for centering and arresting an aircraft positioned on a take-off and landing platform or starting therefrom and landing thereon, particularly a captive aircraft having a rotor and a landing ring, comprising platform means and rotatable displacing ring means,
   means for rotating said displacing ring means,
   vertically-displaceable and spring-suspended gripper means distributed at the circumference of said platform means and said displacing ring means, said gripper means being pivotal about centering and locking means,
   means for running said gripper means against an aircraft landing ring after the aircraft has landed on said platform means, thereby pushing the aircraft into a centered position, at which time the aircraft is brought into the arrested position thereof by rotation about its vertical axis,
   and means for vertically displacing said gripper means, whereby said aircraft is pulled against said platform means.

2. A device according to claim 1 in which the means for rotating the displacing ring means is a double-acting cylinder means.

3. A device according to claim 2 in which said cylinder means actuates said centering and locking means synchronously and in a specific sequence by means of said rotatable displacing ring means and cam means on said ring means.

4. A device according to claim 1 including control signal means for beginning the arresting procedure, after alignment of the aircraft.

* * * * *